(12) United States Patent
Holland et al.

(10) Patent No.: US 10,970,408 B2
(45) Date of Patent: *Apr. 6, 2021

(54) METHOD FOR SECURING A DIGITAL DOCUMENT

(71) Applicant: SAFENET INC., Belcamp, MD (US)

(72) Inventors: Christopher Holland, Cedar Park, TX (US); Russell Egan, Cedar Park, TX (US)

(73) Assignee: THALES DIS CPL USA, INC., Belcamp, MD (US)

( * ) Notice: Subject to any disclaimer, the term of this patent is extended or adjusted under 35 U.S.C. 154(b) by 185 days.

This patent is subject to a terminal disclaimer.

(21) Appl. No.: 16/156,353

(22) Filed: Oct. 10, 2018

(65) Prior Publication Data

US 2020/0117813 A1 Apr. 16, 2020

(51) Int. Cl.
*G06F 21/62* (2013.01)
*G06F 21/60* (2013.01)
*G06F 16/93* (2019.01)

(52) U.S. Cl.
CPC .......... *G06F 21/6209* (2013.01); *G06F 16/93* (2019.01); *G06F 21/604* (2013.01)

(58) Field of Classification Search
CPC ...... G06F 21/00; G06F 21/602; G06F 21/604; G06F 21/62; G06F 21/6209;
(Continued)

(56) References Cited

U.S. PATENT DOCUMENTS 8,037,157 B2 10/2011 Xiao et al.
8,364,712 B2 1/2013 O'Sullivan et al.
(Continued)

FOREIGN PATENT DOCUMENTS

| CN | 101859360 A | 10/2010 |
|---|---|---|
| CN | 102722737 A | 10/2012 |
| WO | 02/33518 A2 | 4/2002 |

OTHER PUBLICATIONS

Notification of Transmittal of the International Search Report and the Written Opinion of the International Searching Authority (Forms PCT/ISA/220, PCT/ISA/210, and PCT/ISA/237) dated Dec. 13, 2019, in related International Application No. PCT/US2019/055536. (12 pages).

(Continued)

*Primary Examiner* — Thanhnga B Truong
(74) *Attorney, Agent, or Firm* — Buchanan Ingersoll & Rooney PC

(57) ABSTRACT

A method for securing a digital document comprising first and second types of data, where a set of data of the second type is previously identified in an initial version of the document. For each data of the second type, an identifier is allocated to the data and an entry comprising the data is stored in a secure storage unit. The identifier comprises a display value and a link value. The data is reachable in the secure storage unit through the link value. The secure storage unit is configured to use access rules for authorizing or denying a request initiated by a user for accessing data of the second type contained in an entry of the secure storage unit. An updated version of the digital document is generated by replacing each data of the second type by its allocated identifier in the initial version of the digital document.

14 Claims, 2 Drawing Sheets

(58) Field of Classification Search
CPC ............. G06F 21/6245; G06F 21/6218; G06F 16/9566; G06F 21/33; G06F 15/00; G06F 9/44; G06F 3/00; G06F 21/60; G06F 16/93; G06F 21/64; H04L 9/0863; H04L 63/20; H04L 63/102; H04M 11/00
See application file for complete search history.

(56) References Cited

U.S. PATENT DOCUMENTS

| | | | |
|---|---|---|---|
| 8,458,487 B1* | 6/2013 | Palgon | G06F 21/00 380/277 |
| 10,025,941 B1* | 7/2018 | Griffin | G06F 21/6209 |
| 2005/0132070 A1* | 6/2005 | Redlich | G06F 21/6209 709/228 |
| 2010/0082687 A1 | 4/2010 | Saito | |
| 2013/0110775 A1 | 5/2013 | Forsythe | |
| 2013/0227271 A1 | 8/2013 | Pampagnin | |
| 2016/0292441 A1* | 10/2016 | Stuntebeck | G06F 21/6218 |
| 2018/0189502 A1* | 7/2018 | Kumar | G06F 21/6254 |
| 2019/0020687 A1* | 1/2019 | Noon | G06F 16/9535 |

OTHER PUBLICATIONS

Notification of Transmittal of the International Search Report and the Written Opinion of the International Searching Authority (Forms PCT/ISA/220, PCT/ISA/210, and PCT/ISA/237) dated Dec. 13, 2019, in related International Application No. PCT/US2019/055551. (12 pages).

Notification of Transmittal of the International Search Report and the Written Opinion of the International Searching Authority (Forms PCT/ISA/220, PCT/ISA/210, and PCT/ISA/237) dated Dec. 13, 2019, in realted International Application No. PCT/US2019/055579. (12 pages).

* cited by examiner

METHOD FOR SECURING A DIGITAL DOCUMENT

FIELD OF THE INVENTION

The present invention relates to methods for securing digital documents. It relates particularly to methods of securing access to digital documents comprising at least two types of data requiring different security level managements.

BACKGROUND OF THE INVENTION

Many laws and company policies exist around the world to restrict access to certain classes of information stored in structured documents. It is known to encrypt the full document or to redact the document. Redaction provides no simple or automated means to recover the sensitive information. Encryption renders the document entirely unusable by any system without access to the encryption key. This creates significant inconveniences including, for example, the ability for a computer system to index file contents for the purpose of creating a searchable index. In addition, encryption of a document using a key (either cryptographic or password) requires significant controls over the key— including the distribution and control of the key. There is need to provide a solution allowing for the document to be usable and freely distributed except that access to sensitive information remain restricted.

SUMMARY OF THE INVENTION

The invention aims at solving the above mentioned technical problem.

An object of the present invention is a computer-implemented method for securing a digital document comprising first and second types of data. A set of data of the second type has been previously identified in an initial version of said digital document. The method comprises the following steps:

for each data of the second type, allocating an identifier to said data and storing an entry comprising said data in a secure storage unit, said identifier comprising a display value and a link value, said data being reachable in the secure storage unit through said link value, the secure storage unit being configured to use access rules for authorizing or denying a request initiated by a user and aiming at accessing a data of the second type comprised in an entry of the secure storage unit, and generating an updated version of the digital document by replacing each data of the second type by its allocated identifier in the initial version of the digital document.

Advantageously, the user may be provided with the updated version of the digital document, data of the first type may be displayed to the user via a first software application and data of the second type may be displayed to the user via a second software application separate from the first software application.

Advantageously, the data of the second type may be sensitive data.

Advantageously, the identifier may be a uniform resource identifier.

Advantageously, the access rules may take into account the user's profile, the type of user's device or the user's location.

Advantageously, the access rules may define access rights which are set with an expiration date.

Advantageously, any attempts to access data of the second type from the updated version of the digital document may be logged.

Another object of the present invention is an automated system for securing a digital document comprising first and second types of data, a set of data of the second type being previously identified in an initial version of said digital document. The automated system comprises a hardware processor, a secure storage unit and a generator including instructions that, when executed by the processor, cause said generator, for each data of the second type, to allocate an identifier to said data and to store an entry comprising said data in the secure storage unit, said identifier comprising a display value and a link value, said data being reachable in the secure storage unit through said link value. The secure storage is adapted to use access rules for authorizing or denying a request initiated by a user and aiming at accessing a data of the second type comprised in an entry of the secure storage unit. The instructions, when executed by the processor, cause said generator to generate an updated version of the digital document by replacing each data of the second type by its allocated identifier in the initial version of the digital document.

Advantageously, the system may be configured to log any attempt to access data of the second type from the updated version of the digital document.

BRIEF DESCRIPTION OF THE DRAWINGS

Other characteristics and advantages of the present invention will emerge more clearly from a reading of the following description of a number of preferred embodiments of the invention with reference to the corresponding accompanying drawings in which.

DETAILED DESCRIPTION OF THE PREFERRED EMBODIMENTS

The invention may apply to any type of digital document comprising several types of data that need to be managed according to different security policies. It is well-suited for managing structured documents comprising sensitive data. It applies to any digital document like a text file or a spreadsheet document.

Figure 1:
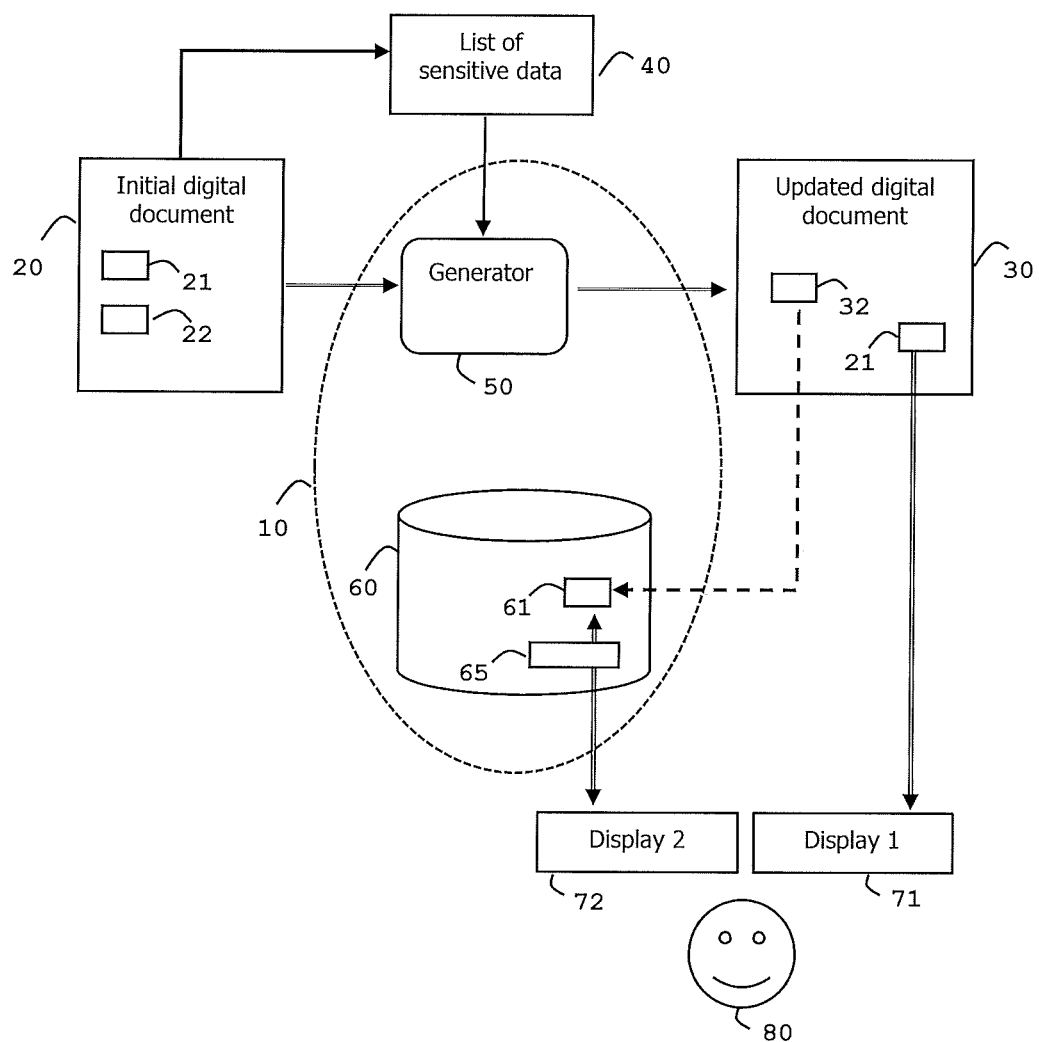
FIG. 1 is an example of architecture of an automated system according to the invention.

FIG. 1 shows an example of architecture of an automated system according to the invention.

In this example, the automated system 10 is deployed in cloud environment.

The automated system 10 comprises a generator 50 and a secure storage unit 60.

Assuming that an initial version 20 of a document contains both data of first and second types, the automated system 10 is designed to take as input data both the initial version 20 of the document and a list 40 of data of the second type contained in the initial version 20 of the document. The list 40 may be built by a so-called automated Data Discovery and Classification Process.

For example data of the second type may be financial reports, medical information, personally identifiable information (PII) or confidential data.

Alternatively, the system can be adapted to automatically identify the data of the second type contained in the initial version 20 of the document.

The generator includes a hardware processor and a first set of instructions that, when executed by the processor, causes said generator, for each data of the second type, to allocate an identifier to said data and to store an entry comprising said data in the secure storage unit. Each identifier comprises a display value and a link value. The data (of the second type) allocated to an identifier is reachable in the secure storage unit through the link value of the identifier. For example, the identifier 32 can be a Uniform Resource Locator (URL) made of a text display value and an address as link value.

For instance, the identifier can be set with the following content:

HX40DD2:https://xyz.com/app/215fdtrffq278rjf08f where the display value is set to "HX40DD2" and the link value is set to "https://xyz.com/app/215fdtrffq278rjf08f".

Alternatively, the display value can be a non-textual information like an icon or a button.

More generally the identifier can be a Uniform Resource Identifier (URI) or an identifier value which is only unique within some context derived from the enclosing document and the document's context.

An example of identifier might be a numeric identifier, having a format similar to a credit card number, residing in a document stored in a cloud storage service and given a unique identifier in that storage service. The full URI for that protected data would be the identifier value as well as the unique ID of the document.

In order to simplify the presentation, only one identifier 32 is represented at FIG. 1. The document may comprise several data of the second type. The document may also comprise data of more than two types.

Preferably, the display value is visible to a user reading the updated version 30 of the document while the link value is not visible although present.

Alternatively, the link value can also be visible to a user reading the updated version of the document.

The generator includes a second set of instructions that, when executed by the processor, cause said generator to generate an updated version 30 of the digital document by replacing each data of the second type by its allocated identifier in the initial version of the digital document.

The secure storage unit 60 can include a database (or a file system), a set of access rules and a controller engine 65 able to check whether a request trying to access a record stored in the secure storage unit complies with the access rules. The controller engine is able to authorize or deny the request according to predefined access rules. The controller engine may check user's credentials like a passphrase, a biometric data, a One-Time password or a cryptographic value computed from a secret key allocated to the user for example.

Each entry stored in the secure storage unit 60 can comprise several fields. For example, an entry may have the following structure:

| Index | URI | Short code | Metadata | Information |
| --- | --- | --- | --- | --- | where Index has a unique value allowing to identify the entry among the others, where URI is the link value, where Short Code is the display value, where Metadata may contain various data like the entry creation/update date, author, country origin, file name of the updated version of the document, and where Information is a sensitive data removed from the document.

In one embodiment, the access rules can be defined according to the profile of the users. For instance, a user accredited at level 2 is authorized to access all types of data while a user accredited at level 1 can only access data of first type.

In another embodiment, the access rules can be defined according to both the profile of the user and the type of data. For instance, a financial data can be accessed only by Finance employees.

In another embodiment, the access rules can be defined so as to take into account the type of user's device (e.g. a Personal computer may be assumed to be more secure than a smart phone).

In another embodiment, the access rules can be defined to take into account the user's location. Thus access to a target data type can be restricted to users located in the company office only for instance.

In another embodiment, the access rules can define access rights which are set with an expiration date.

The system can be configured to log any attempt to access data of the second type from the updated version of the digital document. Hence repeated unauthorized attempts may be detected and trigger appropriate security measures. Such log may also be used to monitor and size the system.

Although the system described at FIG. 1 manages two types of data, the system of the invention may manage a large number of types of data.

Once the updated version 30 of the document has been generated, it can be made available to a user 80.

Then the user 80 can start reading the updated version 30 of the document. For instance, the non-sensitive data 21 (i.e. data of the first type) can be freely displayed to the user through a first software application 71 (like MS-Word®) while the sensitive data (i.e. data of the second type) are displayed to the user through a second software application 72 (like Web-browser) only if the user has properly authenticated to the secure storage unit 60.

Alternatively, the first software application may be the second software application. In such a case, the user can read the whole document through a single application. Thus it would be possible for the user to download a copy of the document with the sensitive data in their original locations (or a subset of the sensitive data) which could be opened in the original software application, like MS-Word.

Figure 2:
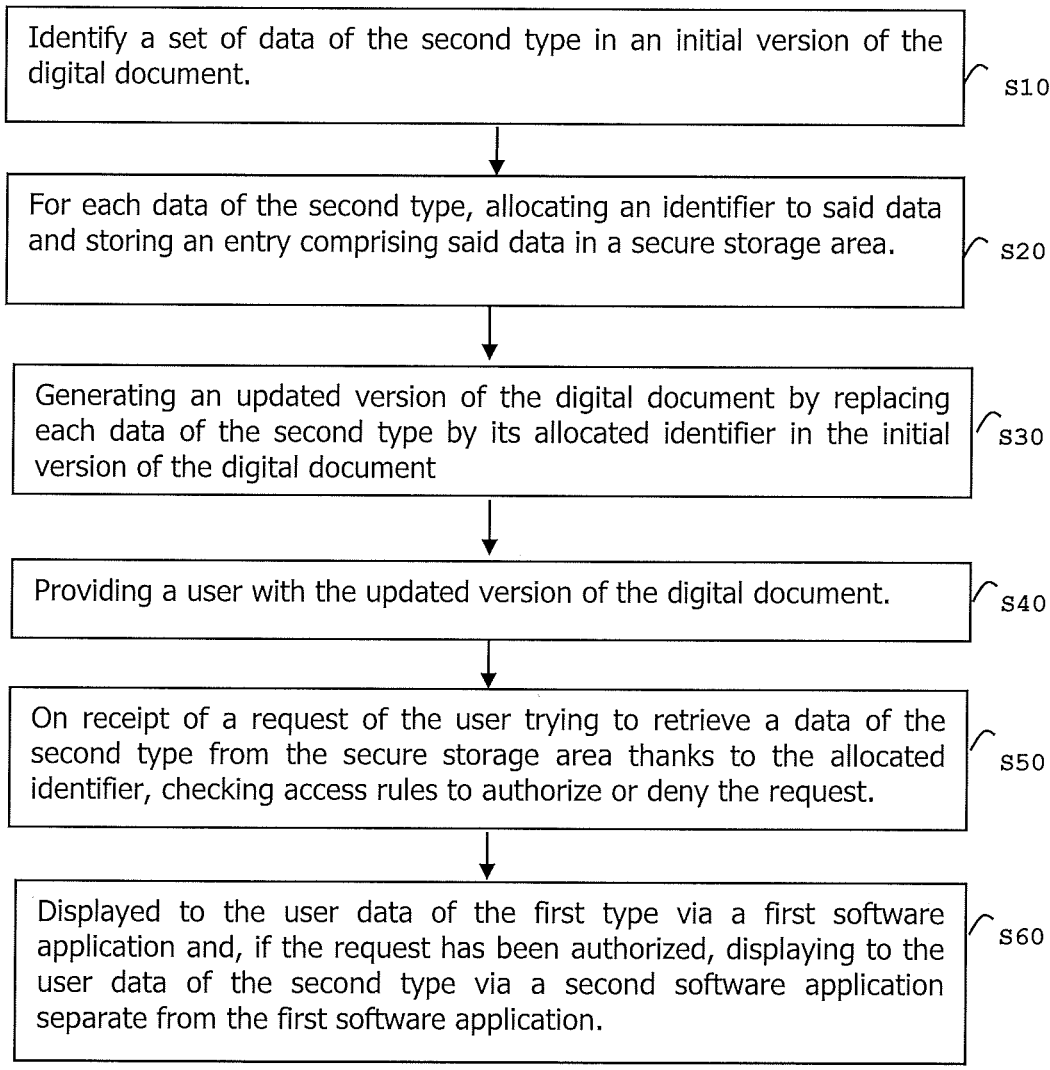
FIG. 2 depicts a flow chart for securing access to a document according to an example of the invention.

FIG. 2 shows a flow chart for securing access to a digital document according to an example of the invention.

At step S10, the initial version 20 of the digital document is parsed to identify a set of data of the second type. This step can be performed manually or automated using mechanism automated Data Discovery and Classification Process which is known per se.

At step S20, for a data 22 of the second type, an identifier 32 is allocated to said data and an entry 61 comprising said data 22 is stored in the secure storage unit 60. The identifier can be generated on-the-fly or retrieved from a preset list of pattern stored in the secure storage unit or in another device. This process is performed for each data of the second type found in the initial version of the document.

If the document contain data belonging to more than two types, the step 20 is executed as many times except for the data of the first type.

At step 30, an updated version 30 of the digital document is generated by replacing each data of the second type by its allocated identifier in the initial version of the digital document. It is to be noted that at the end of this step, the data of the second type do not appear as such in the updated version any more. They have been moved to the secure storage unit 60.

Steps 20 and 30 may be combined in one step.

At step 40, a user is provided with the updated version of the digital document. The new document (updated version) can be sent or made available via a repository for example.

At step 50, the user wants to read the digital document and opens the updated version through a first application dedicated to word processing for instance. All data of the first type appear in the first application. To get a data of the second type, the user triggers its link value by clicking on the associated display value. The user then provides his/her credentials (and possibly additional information) to the secure storage unit. On receipt of the request initiated by the user, the secure storage unit checks its own access rules to authorize or deny the user's request.

At step 60, assuming that the request has been authorized, the data of the second type is displayed to the user via a second software application. For instance, the sensitive data (second type) is displayed through a browser interface.

In one embodiment, the user must authenticate each time a request to retrieve a sensitive data is received by the secure storage unit.

In another embodiment, the secure storage unit may authenticate the user only once and authorize further access from this user during a session without new credentials checking.

For instance a session can be an authenticated context established between the user's web browser and the web server which provides access to the sensitive data. The session can be materialized as a cookie.

It must be understood, within the scope of the invention, that the above-described embodiments are provided as non-limitative examples. In particular, the features described in the presented embodiments and examples may be combined.

A secure storage unit can store data related to several updated versions of a plurality of documents.

The invention allows freely forwarding or distributing a document without revealing certain critical information. Hence the updated version of a document may be emailed, printed, stored on a cloud service without containing certain information whose access must remain restricted. Moreover, the access control rules can be applied selectively based on who is accessing, on what device, from where as well as the class of the information.

Thanks to the invention, access to part of the document can be dynamically refined (Access rules can be changed at any time) since Access rules are enforced only when a user attempts to access the protected data.

In addition, the invention allows to centralize credentials management and highly ease the management of secret/encryption keys.

The architecture of the system shown at FIG. 1 is provided as example only. This architecture may be different. For example, the generator can work with several secure storage units or the secure storage unit can include several databases.

Although described in the framework of cloud environment, the invention also applies to any type of framework.

The invention claimed is:

1. A computer-implemented method for securing a digital document comprising first and second types of data, a set of data of the second type being previously identified in an initial version of said digital document, wherein the method comprises the steps:

for each data of the second type, allocating an identifier to said data and storing an entry comprising said data in a secure storage unit, said identifier comprising a display value and a link value, said data being reachable in the secure storage unit through said link value, the secure storage unit being configured to use access rules for authorizing or denying a request initiated by a user and aiming at accessing a data of the second type comprised in an entry of the secure storage unit, generating an updated version of the digital document by replacing each data of the second type by its allocated identifier in the initial version of the digital document, and providing the user with the updated version of the digital document by displaying data of the first type to the user in a first software application while displaying data of the second type to the user in a second software application separate from the first software application, said user being an individual.

2. The method according to claim 1, wherein said data of the second type are sensitive data.

3. The method according to claim 1, wherein said identifier is a uniform resource identifier.

4. The method according to claim 1, wherein said access rules take into account the user's profile or the user's location.

5. The method according to claim 1, wherein said access rules define access rights which are set with an expiration date.

6. The method according to claim 1, wherein attempts to access data of the second type from the updated version of the digital document are logged.

7. An automated system for securing a digital document comprising first and second types of data, a set of data of the second type being previously identified in an initial version of said digital document, the automated system comprising a hardware processor, wherein the automated system comprises a secure storage unit and a generator including instructions that, when executed by the processor, cause said generator, for each data of the second type, to allocate an identifier to said data and to store an entry comprising said data in the secure storage unit, said identifier comprising a display value and a link value, said data being reachable in the secure storage unit through said link value, wherein the secure storage is configured to use access rules for authorizing or denying a request initiated by a user who is an individual and aiming at accessing a data of the second type comprised in an entry of the secure storage unit, wherein said instructions, when executed by the processor, cause said generator to generate an updated version of the digital document by replacing each data of the second type by its allocated identifier in the initial version of the digital document, and wherein the automated system comprises a first software application and a second software application separate from the first software application, wherein the first software application is configured to display data of the first type to the user while the second software application is configured to display data of the second type to the user.

8. The system according to claim 7, wherein said data of the second type are sensitive data.

9. The system according to claim 7, wherein said identifier is a uniform resource identifier.

10. The system according to claim 7, wherein said access rules take into account the user's profile or the user's location.

11. The system according to claim 7, wherein said access rules define access rights which are set with an expiration date.

12. The system according to claim 7, wherein the system is configured to log any attempt to access data of the second type from the updated version of the digital document.

13. The method according to claim 1, wherein said access rules take into account the type of user's device.

14. The system according to claim 7, wherein said access rules take into account the type of user's device.

* * * * *